Jan. 22, 1957  R. F. THORNTON  2,778,245
DIFFERENTIAL TRANSMISSION
Filed Aug. 31, 1951  2 Sheets-Sheet 1
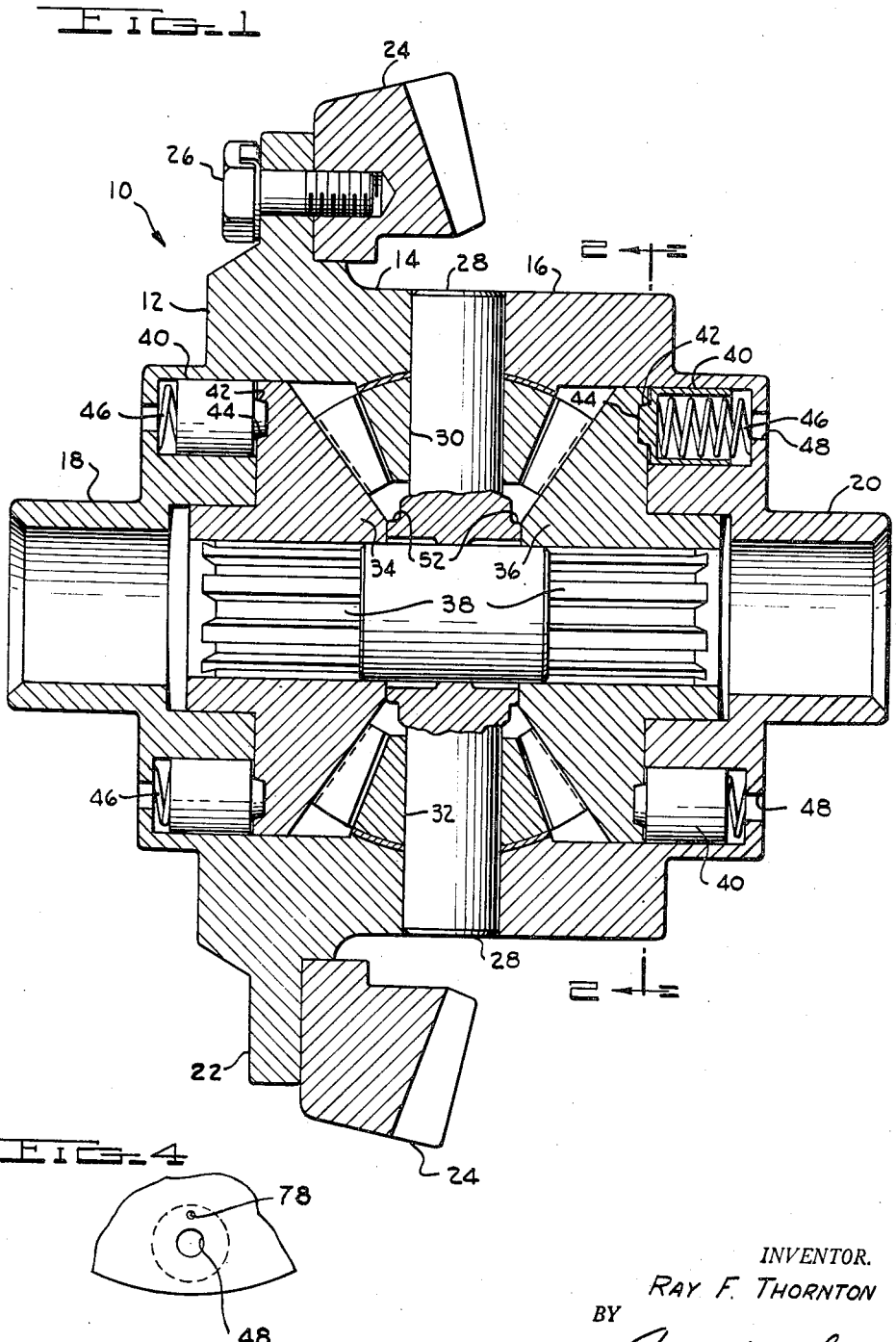
INVENTOR.
RAY F. THORNTON
BY
Arthur M. Smith
ATTORNEY Jan. 22, 1957   R. F. THORNTON   2,778,245
DIFFERENTIAL TRANSMISSION
Filed Aug. 31, 1951                              2 Sheets-Sheet 2
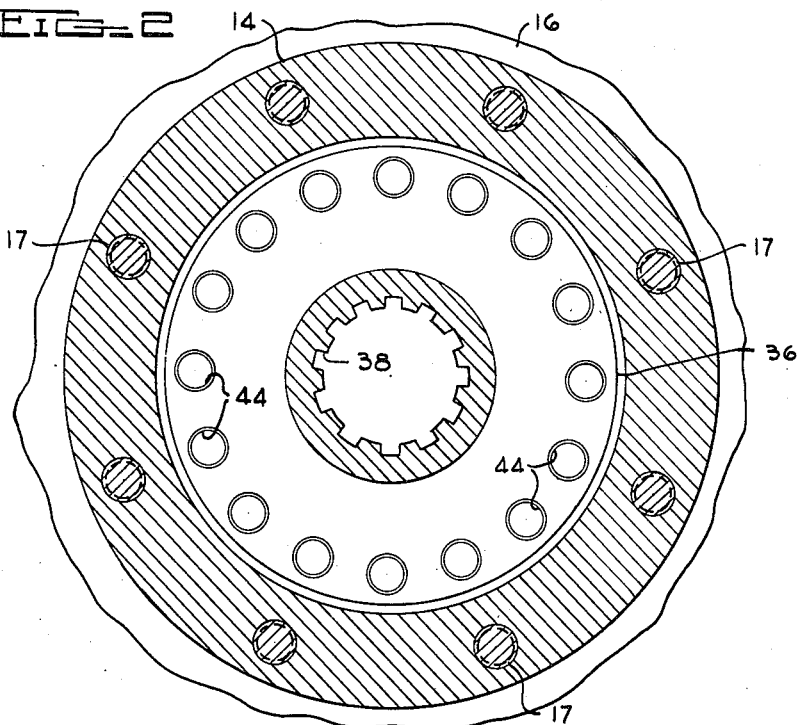
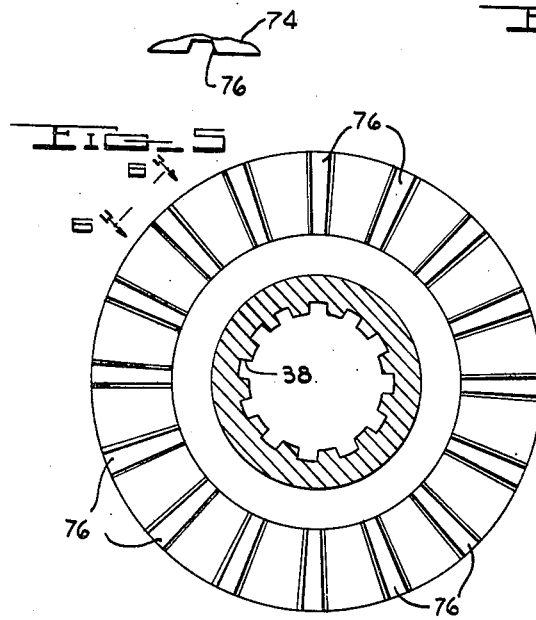
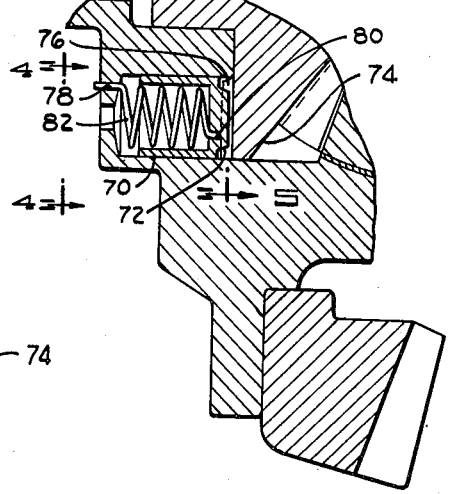
INVENTOR.
RAY F. THORNTON
BY
Arthur M. Smith
ATTORNEY

United States Patent Office 2,778,245
Patented Jan. 22, 1957

2,778,245

DIFFERENTIAL TRANSMISSION

Ray F. Thornton, Dexter, Mich., assignor of one-sixth to Irving Grant, one-sixth to B. L. Diamond, and one-half to J. M. R. Lyeth, Jr., Detroit, Mich.

Application August 31, 1951, Serial No. 244,611

3 Claims. (Cl. 74—711)

This invention relates to a differential transmission device and more particularly to such a device as is used in the driving axle of an automobile for the purpose of permitting rotation of one of the driving wheels relative to the other.

As is well known to motorists and to others skilled in the art, when one of the rear or driving wheels of a motor vehicle loses traction and begins to spin, the other rear or driving wheel remains stationary, if it has traction, and does not operate to move the vehicle. Because of this condition, a motor vehicle is completely immobilized if only one of the driving wheels loses traction, as so frequently occurs when driving on wet, slippery or muddy surfaces.

This condition creates a serious problem, particularly among military vehicles which may be required to travel over fields and roads which are in such condition that relatively poor traction is provided for the wheels. As is quite obvious, the differential can be eliminated, but a vehicle so-constructed would have difficulty making sharp turns and under certain circumstances, the rear axles would be placed under such stresses and strains that they would ultimately be broken.

It is an object of the present invention to provide a differential transmission for a motor vehicle which transmission is constructed and arranged so that the rear axle acts as a solid axle when the vehicle is moving over areas where poor traction is provided, and which is constructed and arranged to permit differential movement of one drive wheel relative to the other when a predetermined differential load is applied to said wheels.

It is another object of the present invention to provide a differential transmission of the foregoing character wherein resilient detent mechanisms are operatively disposed between the gear train and the rotatable case of the gear train for effecting the locking action of the differential transmission, and which detent mechanisms are constructed and arranged so that the resilient characteristics can be readily and easily changed.

Still another object of the present invention is to provide means in the gear train for maintaining the differential gears in proper relation to the idling gears so that such gears will not be damaged by being misaligned from the biasing action of the aforesaid resilient detent mechanisms.

It is still another object of the present invention to provide a differential transmission of the foregoing character in which the differential gears are constructed and arranged to permit the gear teeth to be forged to shape and further to enable depressions to be forged on the reverse side thereof for receiving the detent mechanisms, thereby reducing the manufacturing costs of the same.

Still another object of the present invention is to provide a locking differential transmission which can be economically produced and installed in a motor vehicle and which will permit normal operation of the motor vehicle in the event the locking mechanisms become defective.

Other objects of this invention will appear in the following description and appended claims, reference being had to the accompanying drawings forming a part of this specification wherein like reference characters designate corresponding parts in the several views.

In the drawings:

Fig. 1 is a vertical sectional view of one modification of the invention;

Fig. 2 is a fragmentary sectional view taken on the line 2—2 of Fig. 1;

Fig. 3 is a fragmentary sectional view of another modification of the invention;

Fig. 4 is a fragmentary view of the modification shown in Fig. 3 showing the end construction of the housing for one of the detent mechanisms;

Fig. 5 is an end view of one of the differential gears used in the modification shown in Fig. 3; and Fig. 6 is a fragmentary sectional view taken on line 6—6 of Fig. 5.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, and particularly to Figs. 1 and 2, one modification of the present invention is illustrated. The differential transmission 10 comprises a housing or case 12 which is adapted to be revolved and which is formed by two mating parts 14 and 16 detachably secured together by a plurality of bolts as at 17 to facilitate installation of the gear train assembly therein.

The case 12 has axially aligned hubs 18 and 20 for receiving axle shafts therein. A flange 22 projects outwardly from the periphery of the casing 12 and has a conventional driving ring gear 24 secured thereto by a plurality of bolts, one of which is shown at 26.

Mounted between the housing parts 14 and 16 is a spider 28 on each of the legs of which is rotatably mounted a pinion gear, as shown at 30 and 32. While only two pinion gears 30 and 32 are shown, it should be understood that there may be more equally spaced legs on the spider 28, each leg having a pinion gear rotatably mounted thereon.

Meshed with the pinion gears are two differential gears 34 and 36 which are oppositely disposed and axially aligned within the case 12. Each of the differential gears 34 and 36 have internal splines into which the splined ends of axle shafts (not shown) can be inserted.

As is understood by those skilled in the art, a differential transmission which contained no more than what is described above would permit one of the drive wheels to spin relative to the other if said one wheel lost traction, and this in turn, would result in the other driving wheel remaining idle so that the vehicle would be immobile.

In order to overcome this condition, a plurality of detent mechanisms are operatively disposed between the case 12 and the differential gears 34 and 36. These detent mechanisms each include a hollow piston 40 which is closed at one end and has a frusto-conical projection 42 extending outwardly therefrom. The rear faces of each of the differential gears 34 and 36 each have a plurality of recesses 44 for receiving the projections 42, said recesses being disposed in circular arrangement coaxial of the differential gear axes.

Extending into the pistons 40 are coil springs 46 which are held in compression between the case 12 and the closed ends of the pistons 40 so as to bias the projections 42 into the recesses 44 to provide a limited locking action between the casing 12 and the differential gears 34 and 36. The apertures 48 are provided in the case 12 to facilitate lubricating the detent mechanisms Since the coil springs 46 normally will exert sufficient pressures on the differential gears 34 and 36 to overcome the thrust tending to move such gears outwardly away from pinion gears 30 and 32, it is necessary that means be provided for limiting the axially inward movement of the differential gears 34 and 36. In the present embodiment, this is accomplished by the shoulders 52 formed on opposite sides of spider 28. By virtue of this arrangement, the differential gears will not be pressed into the pinion gears 30 and 32 to cause unnecessary wear on such gears. It should be understood that other spacing means such as hardened washers or the like may also be employed.

It is found most desirable that the projections 42 be formed with the interior angle of slope of the frusto-conical sidewalls approximately 75°, and with the height of the frusto-conical projections 42 being approximately 1/8 inch when the base thereof has a diameter of approximately 7/16 inch. This arrangement provides the most desirable locking results for a differential gear train of the relative size shown in Fig. 1 of the drawings. As shown in Fig. 2, sixteen detent mechanisms can be used and this number is found to produce desirable results.

A construction with the above relative dimensions when tested on a motor vehicle with one wheel jacked up and free to rotate will produce 500–600 pounds of draw bar pull before said one wheel will begin to rotate. Thus, it can be seen that this construction will prevent spinning of one drive wheel relative to the other when driving on wet, slippery or muddy surfaces, but will permit a differential action so that the rear axle is not unnecessarily strained when the vehicle is turned, nor will the one tire be scuffed when turning on a surface providing good traction.

Referring now to Figs. 3–6, a modified form of the invention is shown. This embodiment employs the same gear train, but the detent mechanisms are varied. The hollow piston 70 has its inner end closed and has a rib 72 projecting outwardly therefrom, which in cross section will have a configuration substantially the same as that of the cross section of the frusto-conical projection 42 shown in Fig. 1 of the drawings. The differential gear 74 has sixteen radially extending grooves 76 formed on the rear face thereof for receiving eight equally spaced ribs 72. The latter have sloping sidewalls which preferably have an included angle of approximately 75°.

Apertures 78 and 80 are formed respectively in the case 12 and the end of each of the pistons 70 for receiving the opposite ends of the coil springs 82. In order that the ribs 72 will remain aligned to seat into the radially extending grooves 76, it is only necessary that each set of apertures 78 and 80 into which the ends of their associated coil spring 82 extend be located in a plane which includes the axes of the differential gear 74. Each of the coil springs 82 will then maintain the ribs 72 in a radial direction so that they will mesh with the grooves 76.

It should be observed that the angle of slope of the sidewalls of the ribs 72 is substantially the same as the angle of slope of the frusto-conical projections 42 of the previously described embodiment. This enables the modification of Figs. 3–6 to have substantially the same extent of differential lock as the first-described embodiment.

In each of the above-described embodiments, the gears of the gear train may be cut in any conventional manner or may be forged to shape. It is preferred that the latter manner of manufacture be used, since the recesses 44 or grooves 76 can then be easily formed in the gear blanks for the differential gears 34 or 74.

From the foregoing description, it can be seen that a semi-locking differential transmission has been developed which can be used on a motor vehicle to substantially eliminate the problem of the vehicle becoming immobilized merely because one of the driving wheels loses its traction. Further, it eliminates to a great extent some of the hazards of driving which result from slippery or icy roads, since the driver can control his vehicle much more readily when his driving wheels turn together as one unit. It will also be understood that the above-described invention reduces wear on tires when the vehicle is to be driven at high speeds over highways, since under these conditions of operation one or the other drive wheel regularly bounces away from the surface of the highway and when this occurs with vehicles using a conventional type of differential transmission, the wheel which has left the road surface will be spun at a very high rate of speed. This results in excessive wear of the tire when the latter again strikes the road surface, and it can be readily understood that this condition cannot occur with the present invention in which one wheel would not be free to rotate relative to the other under such conditions.

The present invention can also be readily manufactured and easily installed in conventional motor vehicles. This locking type of differential can also be used in many different applications and is especially valuable when used between the axles of four and six-wheel drive units. In all applications, the differential mechanism is capable of providing a lock for the torque delivered by the propeller shaft through the pinion and ring gears and at the same time allows the differential to unlock due to the torque developed between the driving wheels when making a turn. It is possible that by adjusting the spring pressure of the coil springs 46 or 82 this condition can be arranged for any particular application involved.

Having thus described my invention, I claim:

1. In a differential transmission unit, the combination of a rotatable gear case, a power transmission gear train operatively positioned within said case, said gear train including a spider, a plurality of pinion gears rotatably mounted on the legs of said spider, a pair of oppositely disposed differential gears meshed with said pinion gears, said differential gears abutting bearing surfaces of said spider on their inner sides and abutting the wall of said casing on their outer sides to prevent axial movements thereof, and a plurality of independent resilient, relatively closely spaced, detent means operatively disposed between the end wall of said casing and notched outer side walls of the differential gears for resisting rotative movement of said differential gears until predetermined torque is applied thereto, and means resiliently biasing said plungers against rotation and into said notched side walls.

2. In a differential transmission unit, the combination of a rotatable gear case, a power transmission gear train operatively positioned within said case, some of the members of said gear train having a plurality of depressions on surfaces thereof, a plurality of plungers resiliently mounted in said casing so that the ends thereof will be biased into said depressions for opposing movement of said gear train, the resilient mountings for said plungers including coil springs each having its one end secured in said casing and its other end in its associated plunger so that the latter cannot rotate about its axis.

3. In a differential transmission unit, the combination of a rotatable gear case, a power transmission gear train operatively positioned with said case, said gear train including a pair of oppositely disposed differential gears adapted for receiving axle shafts and having a plurality of depressions formed in side surfaces thereof coaxially of said axle shafts, a plurality of plungers resiliently mounted in said case with their axes parallel to the axis of the axle shaft so that the ends thereof will be biased into said depressions for opposing movement of said differential gears, the ends of said plungers having a straight rib projecting therefrom with the sides converging from the base, said sides having an included angle of approximately 75°, and means to resist rotation of said plungers to insure engagement of said plunger ends and said depressions.

References Cited in the file of this patent

UNITED STATES PATENTS

| | | |
|---|---|---|
| 1,193,709 | Mennie | Aug. 9, 1916 |
| 1,209,007 | Mennie | Dec. 19, 1916 |
| 1,324,859 | Taylor | Dec. 16, 1919 |
| 1,344,107 | Wilkin | June 22, 1920 |
| 1,355,297 | Woodward | Oct. 12, 1920 |
| 1,460,064 | Keck | June 26, 1923 |
| 1,481,889 | Carhart | Jan. 29, 1924 |
| 1,494,457 | Woodward | May 20, 1924 |
| 1,641,190 | Morgan | Sept. 6, 1927 |
| 1,750,981 | Wildhaber | Mar. 18, 1930 |
| 1,786,492 | Hustret | Dec. 30, 1930 |
| 1,883,725 | Guilmette | Oct. 18, 1932 |
| 2,148,481 | LeFrank | Feb. 28, 1939 |